United States Patent [19]
Ogasawara et al.

[11] Patent Number: 5,721,579
[45] Date of Patent: Feb. 24, 1998

[54] LIGHT INTENSITY CONTROLLING APPARATUS AND IMAGE FORMING APPARATUS THEREWITH

[75] Inventors: Yoshimi Ogasawara, Yokohama; Eihiro Sakaki, Tokyo, both of Japan

[73] Assignee: Canon Kabushiki Kaisha, Tokyo, Japan

[21] Appl. No.: 358,362

[22] Filed: Dec. 19, 1994

[30] Foreign Application Priority Data

Dec. 22, 1993 [JP] Japan .................... 5-324766

[51] Int. Cl.$^6$ .................. B41J 2/47; G02B 26/02; G03B 27/72; G01D 15/14
[52] U.S. Cl. .................................................. 347/246
[58] Field of Search ..................... 347/132, 246, 347/247, 234, 235, 248; 250/205; 372/26, 29, 38, 31, 33; 358/296; 369/116

[56] References Cited

U.S. PATENT DOCUMENTS

| | | | |
|---|---|---|---|
| 4,587,396 | 5/1986 | Rubin | 347/247 |
| 5,043,745 | 8/1991 | Inoue et al. | 347/246 |
| 5,130,524 | 7/1992 | Egawa et al. | 347/246 |

*Primary Examiner*—Mark J. Reinhart
*Assistant Examiner*—L. Anderson
*Attorney, Agent, or Firm*—Fitzpatrick, Cella, Harper & Scinto

[57] ABSTRACT

In an image forming apparatus in which scanning of a laser beam modulated by an image signal is performed, and a laser is forced to be turned on in a non-image period in line scanning of the laser beam, an interrupt request is issued to a microcomputer in response to a forced turn-on signal. In a routine that is called in response to the interrupt request, the level of the forced turn-on signal is checked. If no forced turn-on signal is generated, then acquisition of a detected laser beam intensity signal is inhibited. This ensures that the acquisition of the laser beam intensity signal is performed only when the laser is in a normal turn-on state. If a forced turn-on signal is generated, the laser beam intensity signal is acquired, and the laser beam intensity is adjusted according to the acquired value of the laser beam intensity signal. The acquisition of the detected laser beam intensity signal is performed a plurality of times (four times, for example), and the average of the acquired values is calculated thereby producing a normalized detected laser beam intensity for use in the laser beam intensity control. Furthermore, in the above-described routine, after the completion of measuring elapse of a predetermined time, the acquisition of the laser beam intensity signal is performed.

15 Claims, 15 Drawing Sheets

LIGHT INTENSITY CONTROLLING APPARATUS AND IMAGE FORMING APPARATUS THEREWITH

BACKGROUND OF THE INVENTION

1. Field of the Invention

The present invention relates to a light intensity controlling apparatus for controlling the intensity of light emitted by a light source such as a semiconductor laser, and also to an image forming apparatus using the light intensity controlling apparatus.

2. Description of the Related Art

FIG. 8 illustrates a configuration of a conventional light intensity controlling circuit in a laser driving circuit for use in an optical unit. In FIG. 8, reference numeral 40 denotes a laser unit composed of a laser diode 41 and a photodiode 42 disposed adjacent to the laser diode 41. A part of laser beam emitted by the laser diode 41 is detected by the photodiode 42, which in turn outputs a signal S40 proportional to the intensity of the laser beam. Reference numeral 44 denotes a signal comparator for comparing the signal S40 proportional to the laser beam intensity with a reference signal Vt representing a predetermined laser beam intensity to be achieved. The output signal S44 of the signal comparator 44 acts as an error signal representing an error between the signal S40 proportional to the laser beam intensity and the reference signal Vt. Reference numeral 45 denotes a control circuit. According to the error signal S44, the control circuit 45 produces a control signal S45 used to control the light intensity and outputs it to a counter 46.

The counter control signal S45 consists of a control signal for incrementing or decrementing the counter 46. The counter 46 outputs a digital signal S46 representing a count value obtained as a result of an incrementing or decrementing operation performed in response to the counter control signal S45. A digital-to-analog (D/A) converter 47 converts the digital signal S46 to an analog signal S47 for controlling the light intensity. The analog signal S47 is applied to a laser driving circuit 48.

A video signal S1 generated by a controller (not shown) is also applied to the laser driving circuit 48. The laser driving circuit 48 outputs a laser driving signal S48 to the laser diode 41. The laser diode 41 is turned on or off according to the video signal S1, wherein a current applied to the laser diode 41 in response ON of the video signal S1 is determined by the light-intensity-control analog signal S47.

The operation of each element of the circuit shown in FIG. 8 will be described below for an operation in a non-printing state (during a period T2 described later) and a printing operation (during a period T0 described later). In a non-printing state, the control operation is performed as follows. The signal S1 contains a signal used to turn on the laser during an unblanking period of each line. In response to this signal, the laser driving circuit 48 turns on the laser diode 41. In this operation, the laser driving signal S48 applied to the laser diode 41 by the laser driving circuit 48 is determined such that the laser diode 41 is driven by a current having a proper value according to the received light-intensity-control analog signal S47. The photodiodes 42 outputs a signal S40 proportional to the intensity of the emitted laser beam, which is applied to the signal comparator 44.

The signal comparator 44 compares the signal S40 proportional to the laser beam intensity with the reference signal Vt corresponding to the value to be achieved. If the laser beam intensity is less than the value to be achieved, the signal comparator 44 outputs a signal S44 to the control circuit 45 wherein the signal S44 acts as a request signal requesting for an increase in the laser beam intensity. When the signal S40 proportional to the laser beam intensity is equal to the reference signal Vt representing the laser beam intensity to be achieved, the signal comparator 44 outputs a signal S44 to the control signal 45 wherein the signal S44 acts as a request signal requesting for maintaining the laser beam intensity unchanged. In the case where the laser beam intensity is greater than the value to be achieved, the signal comparator 44 outputs a signal S44 to the control signal 45 so that the signal S44 acts as a request signal requesting for lowering the laser beam intensity.

In response to the received comparison signal S44, the controlling signal 45 outputs a counter control signal S45 to the counter 46 wherein the counter control signal S45 acts as a count-up signal, count-down signal, or hold signal depending on the received comparison signal S44. In response to the counter control signal S45, the counter 46 outputs a digital signal S46 consisting of a plurality of bits to the D/A converter 47 wherein the digital signal S46 is incremented, decremented, or maintained depending on the counter control signal S45. The D/A converter 47 converts the received digital signal S46 into an analog signal S47 that is applied as a laser driving signal S48 to the laser driving circuit 48 thereby controlling the intensity of the laser beam emitted by the laser diode 41 of the laser unit 40.

A series of controlling operation steps described above is repeated until the signal S40 proportional to the laser beam intensity has converged to a value within an allowed range in the vicinity of a reference signal Vt corresponding to the laser beam intensity to be achieved wherein the reference signal Vt is set in advance in the signal comparator 44, thereby correcting the variation in the laser beam intensity.

During a printing operation, on the other hand, it is required to maintain the laser driving signal S48 at a given proper value. To achieve this requirement, the control circuit 45 outputs a counter control signal S45 to the counter 46 so that the digital signal S46 acts as a hold signal thereby holding the analog output signal S47 of the D/A converter 47 at a value to which the analog signal S47 has converged in a non-printing period just before the printing operation. Thus, the laser bean intensity is maintained constant during the printing operation. In the printing operation, a video signal is given via the signal S1.

FIG. 9 is a timing chart illustrating the laser beam intensity control operation performed by the circuit shown in FIG. 8, wherein the same elements and signals as those in FIG. 8 are denoted by the same reference numerals. In this timing chart, T0 denotes a one-page printing period, T1 denotes an effective image region period, and T2 denotes a non-printing period. T3 denotes a period in which the laser beam intensity is adjusted to a target value. In other words, the signal S40 proportional to the laser beam intensity converges to a value close to the reference signal Vt during this period T3.

In a non-printing period T2, as can be seen from FIG. 9, the digital signal S46 is cleared, and the counter 46 starts newly its count-up operation from the beginning so that the analog output signal S47 of the D/A converter 47 is increased monotonically while the signal comparator 44 compares the signal S40 proportional to the laser beam intensity with the reference signal Vt, thereby bringing the signal S40 proportional to the laser beam intensity to a value within an allowed range in the vicinity of the reference value Vt corresponding to a target value of the laser beam intensity to be achieved. Thus, the laser beam intensity signal (not shown) converges to a desired value in a time period T3. As described above, the laser beam intensity is controlled at a desired value so that the laser beam intensity that would otherwise change with changes in environmental conditions is maintained constant. Thus, it becomes possible to perform a stable printing operation even in an environment whose temperature varies.

One way to realize a practical hardware construction is to implement the circuit shown in FIG. 8 using a microcomputer that is responsible for control of the entire printing apparatus, as shown in FIG. 10. In FIG. 10, the same elements and signals as those in FIG. 8 are denoted by the same reference numerals. A microcomputer 50 shown in FIG. 10 is adapted to perform those functions performed by the signal comparator 44, controlling circuit 45, counter 46, and D/A converter 47 shown in FIG. 8. Referring to a laser beam control (APC) program for controlling the laser beam intensity shown in FIG. 11, the operation of the microcomputer 50 will be described below. The inventors of the present invention propose here a technique of starting the control program described below (in FIG. 11) in a non-printing period shown in FIG. 10 by a timer interrupt in response to an unblanking interrupt signal. In this case, the control program shown in FIG. 11 is incorporated in a timer interrupt routine itself, or otherwise a flag is set when a timer interrupt occurs, and the laser beam intensity control routine shown in FIG. 11 is executed only when the set-state of the above flag is detected in the main routine.

In response to an unblanking interrupt signal, the laser is turned on, and, at the same time, the laser beam intensity control routine shown in FIG. 11 is called. In step 365 in this routine, the microcomputer 50 acquires A/D-conversion data corresponding to the laser beam intensity detected by the photodiode 42 located adjacent to the laser 41 shown in FIG. 8. Then, in step 366, the acquired data is compared with the reference value Vt corresponding to the target laser beam intensity to be achieved. If the detected laser beam intensity is less than the reference value Vt, the increment is set to A (step 367), and thus V+A is employed as a new laser setting signal (step 368) thereby outputting an analog signal S47 to the laser driving circuit 48 via the D/A converter (step 369). The above-described control steps are performed repeatedly. If the detected laser beam intensity exceeds Vt as a result of the repeated execution of the control steps (step 366), then the routine proceeds to step 370 so as to set the increment to -B. Thus, V-B is employed as a new laser setting signal (step 368), and a corresponding analog signal S47 is applied to the laser driving circuit 48 via the D/A converter (step 369).

The above control routine is performed repeatedly until the detected laser beam intensity signal S40 has converged to a value in an allowed range in the vicinity of the reference value Vt corresponding to the target laser beam intensity to be achieved.

However, in the above technique in which the laser beam intensity is controlled using the microcomputer 50, there is a possibility that the sequential control operation is disturbed by external noise coupled to the input of the microcomputer 50, and a failure occurs in the laser beam intensity control operation.

Because the signal representing the laser beam intensity applied to the A/D converter is a very small signal detected by the photodiode 42, the operation is very sensitive to external noise. A common way to avoid the above problem is to dispose a low-pass filter in the input and output paths of the A/D and D/A converters so as to reduce unwanted external noise. In this case, however, the circuit response of the laser beam intensity control loop becomes slow due to these low-pass filters.

The above problems in this technique cause further trouble as described below. The trouble of this kind often occurs especially in apparatus for forming a color image page by page, as will be described below referring to FIGS. 12 and 13.

FIG. 12 illustrates timing with respective to successive printing operations of a laser color printer in which printing is performed according to reference colors. The TOP signal shown in FIG. 12 represents the position of a leading edge of printing paper, and plays a role similar to that of a vertical synchronizing signal provided for every color component. The BD signal is a reference signal representing the start position of a line of a printing paper, and plays a role similar to that of a horizontal synchronizing signal in a video signal. The unblanking interrupt signal (UBL signal) is a signal that represents an effective area of an image signal wherein a period in which the UBL signal is at an active "H" level corresponds to an effective area. The period T2 is a non-printing period between an adjacent pages or between a color and another color. This period corresponds to a vertical blanking period of a video signal. The laser beam intensity control (unblanking APC) is performed during a non-printing period (unblanking interrupt period; horizontal blanking period) in a period T2. In FIG. 12, M, C, and Y denote printing periods for magenta, cyan, and yellow, respectively.

FIG. 13 illustrates in more detail timing of signals in the horizontal operation shown in FIG. 12. In FIG. 13, the UBL signal also acts as an interrupt request signal applied to the microcomputer 50 as shown in FIG. 10. When the microcomputer 50 detects an edge of a UBL signal, an interrupt occurs at the beginning of a non-printing period. On the other hand, the laser driving circuit 48 is forced to turn on the laser regardless of whether or not a video signal is present in that non-printing period. In FIG. 13, a period in which the forced turn-on signal is at an active "H" level is a forced turn-on period. The PD signal is a response signal S40 of the photodiode (PD) 42 obtained during the forced turn-on period. The response delay due to the low-pass filters described earlier can be seen in the waveform shown in FIG. 13.

At a proper time after the reception of an interrupt request via a UBL signal, the microcomputer 50 acquires data corresponding to the interrupt request via the A/D port. However, if the interrupt request via the UBL signal occurs in the middle of execution of a process according to another interrupt request, or in the middle of execution of another routine, then the interrupt request via the UBL signal will be executed after the completion of the process according to the above other interrupt request. Thus, the timing of the acquisition of the A/D data is not fixed as can be seen from the representation of the timing of the A/D data acquisition in FIG. 13, wherein the allowed A/D data acquisition period is a period in which the signal is at an active "L" level. However, as can be seen apparently from FIG. 13, if there is a special relationship in phase between the allowed A/D data acquisition period and the input data applied to the A/D port, there is a possibility that data corresponding to a reduced laser beam intensity is acquired, as represented by (a) or (b) in FIG. 13. In this case, the laser beam intensity control routine concludes erroneously that the laser beam intensity is less than a target value, and therefore the D/A converter outputs data that will cause the laser beam intensity to increase. As a result, the laser beam intensity exceeds the target value erroneously.

Particularly in color printing, the difference in laser beam intensity level among colors results in a very poor quality printed image. Furthermore, if the laser beam intensity is forced to be at a high level greater than the set point for a continuous long duration, the laser will be degraded.

SUMMARY OF THE INVENTION

It is an object of the present invention to solve the above problems. More specifically, it is an object of the present invention to provide an image forming apparatus having an automatic laser beam intensity control loop that performs a high-reliability operation without being disturbed by improper data acquired in the middle of or after an on-to-off transition of laser emission.

To achieve the above objects, the present invention provides an image forming apparatus having automatic laser beam intensity control means that controls the intensity of a laser beam emitted by a semiconductor laser for formation of an image in such a manner that the intensity of the laser beam emitted by the laser is detected, the detected laser beam intensity is compared with a target value to be achieved, and the laser beam intensity is controlled so that the difference obtained as a result of the above comparison process is minimized, the image forming apparatus being characterized in that the automatic laser beam intensity control means comprises: judgement means for judging whether the operation is in a non-printing period in which the semiconductor laser is in a forced turn-on state when the detected laser beam intensity signal is acquired by A/D conversion means wherein the judgement is performed on the basis of the level of an unblanking interrupt signal; and control means that inhibits the acquisition of the detected laser beam intensity signal if the judgement means has concluded that the operation is not in a non-printing period, and permits the acquisition of the detected laser beam intensity signal only when the judgement means has concluded that the operation is in a non-printing period.

According to a preferred aspect of the present invention, there is provided an image forming apparatus further comprising averaging process mean that: acquires the detected laser beam intensity signal a plurality of times when the control means has given permission to acquire the detected laser beam intensity signal; and determines the average of the plurality of acquired laser beam intensity signals thereby providing a normalized detected laser beam intensity used as automatic laser beam intensity control data.

According to another preferred aspect of the present invention, there is provided an image forming apparatus that includes means that uses the detected laser beam intensity value that was used in the previous automatic laser beam intensity control cycle as automatic laser beam intensity control data, when acquisition of the detected laser beam intensity signal is inhibited by the control means.

According to still another preferred aspect of the present invention, there is provided an image forming apparatus wherein when acquisition of the detected laser beam intensity signal is inhibited by the control means, the averaging process means employs the detected laser beam intensity value that was used in the previous automatic laser beam intensity control cycle, as one of the plurality of detected laser beam intensity values, and determines the average of the plurality of acquired laser beam intensity signals.

According to another preferred aspect of the present invention, there is provided an image forming apparatus wherein if the number of acquisition processes of the laser beam intensity signal has not reached a predetermined number in a predetermined time period, the averaging process means performs the averaging process using laser beam intensity values that have been acquired already by that time limit.

In the present invention, the laser beam intensity is controlled by a control loop according to the control steps comprising of: forcing a laser to be turned on during a non-printing period; detecting a laser beam intensity by a photodiode disposed adjacent to the laser; and comparing the detected laser beam intensity level with a predetermined target level of the laser beam intensity to be achieved; wherein when a detected laser beam intensity signal S40 is acquired, it is checked whether a laser is forced to be turned-on in a non-printing period, and if a laser is not forced to be turned-on in a non-printing period, then the acquisition of the detected laser beam intensity is inhibited.

More specifically, a microcomputer acquires a laser beam intensity via an A/D converter as follows: When the microcomputer receives an interrupt request via an UBL signal, the microcomputer performs a preliminary process (for example, saving the contents of registers). When inputting of A/D conversion data is permitted after the completion of the preliminary process, it is determined whether a laser is forced to be turned-on in a non-printing period judging from the level of the UBL signal before acquiring a detected laser beam intensity S40. If it has been confirmed that a laser is forced to be turned-on in a non-printing period, then the detected laser beam intensity S40 is actually acquired. If it turns out that the operation has proceeded to an effective printing period (this means that the forced turn-on period is over), then the acquisition of the detected laser beam intensity is aborted. Thus, the present invention ensures that the intensity of laser beam emitted by the laser that is in a normal on-state is acquired thereby preventing an erroneous operation of the automatic laser beam intensity control system due to data acquired improperly in the middle of or after an on-to-off transition of laser emission.

Other objects, features, aspects, and advantages of the invention will become apparent from the following description of embodiments, the appended claims, and the accompanying drawings.

DESCRIPTION OF THE PREFERRED EMBODIMENTS

Referring to the accompanying drawings, preferred embodiments of the present invention will be described in detail below.

First Embodiment

Figure 4:
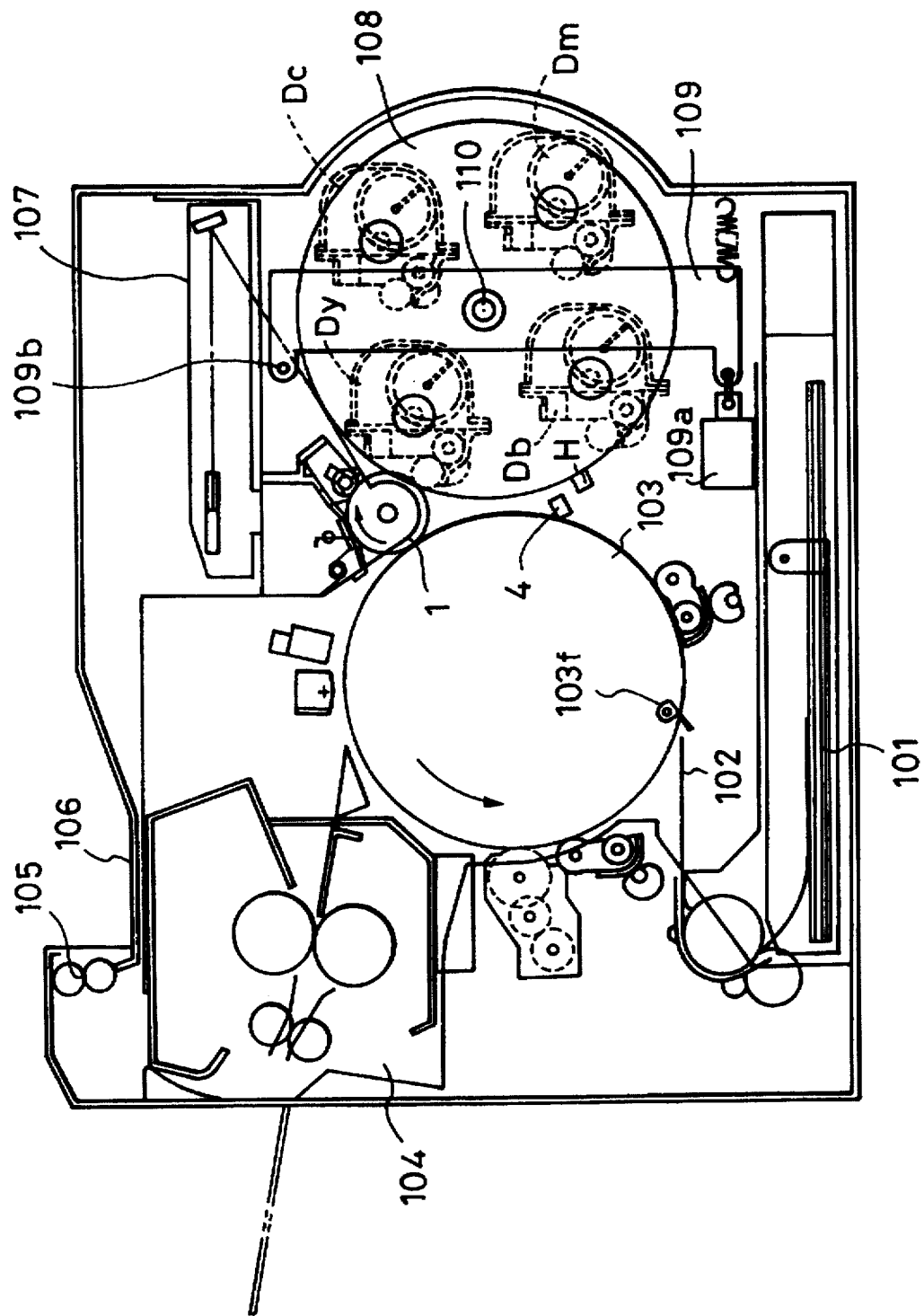
FIG. 4 is a schematic diagram illustrating a color laser printer of the single-drum multiple transfer type, that is an example of a conventional image forming apparatus.

In color laser printers based on electrophotograpy technology, a semiconductor laser is used as image exposure means for forming an electrostatic latent image on a photosensitive material according to an image signal. FIG. 4 illustrates the general construction of a color laser printer of the single-drum multiple transfer type. A piece of paper 102 is fed from a paper feeding tray 101, and the forward end of the paper 102 is gripped by a gripper 103f disposed on a transfer drum 103 so that the paper 102 is held around the outer periphery of the transfer drum 103. A latent image formed via an optical unit 107 on a photosensitive drum 1 for each color is developed by developing units Dy, Dc, Dm, and Db thereby forming an apparent image. The developed image is transferred a plurality of times onto the paper held around the periphery of the transfer drum 103 thereby forming a multiple color image on the paper. The paper 102 is then separated from the transfer drum 103, and the image on the paper 102 is then fixed by a fixing unit 104. The paper is then fed out by a feeding out mechanism 105 onto a printed paper tray 106.

The developing units Dy, Dc, Dm, and Db are supported by a developing unit selection mechanism 108 that rotates about its rotation shaft 110 thereby moving the developing units Dy, Dc, Dm, and Db while keeping their vertical positions so that a proper developing unit is selected, as shown in FIG. 4. When the selected developing unit has been moved to a developing position (the position at which the developing unit Dy is located in the case of FIG. 4), the developing unit selection mechanism 108 and the developing units are driven together by a solenoid 109a via a selection mechanism holding frame 109. Thus, they are rotated about a pivot 109B and moved toward the photosensitive drum 1 to a proper location at which they are positioned. The developing unit selection mechanism 108, that is fixed to a rotation shaft 110 and the selection mechanism holding frame 109, is also fixed to the main portion of the apparatus after the above positioning operation.

Figure 5:
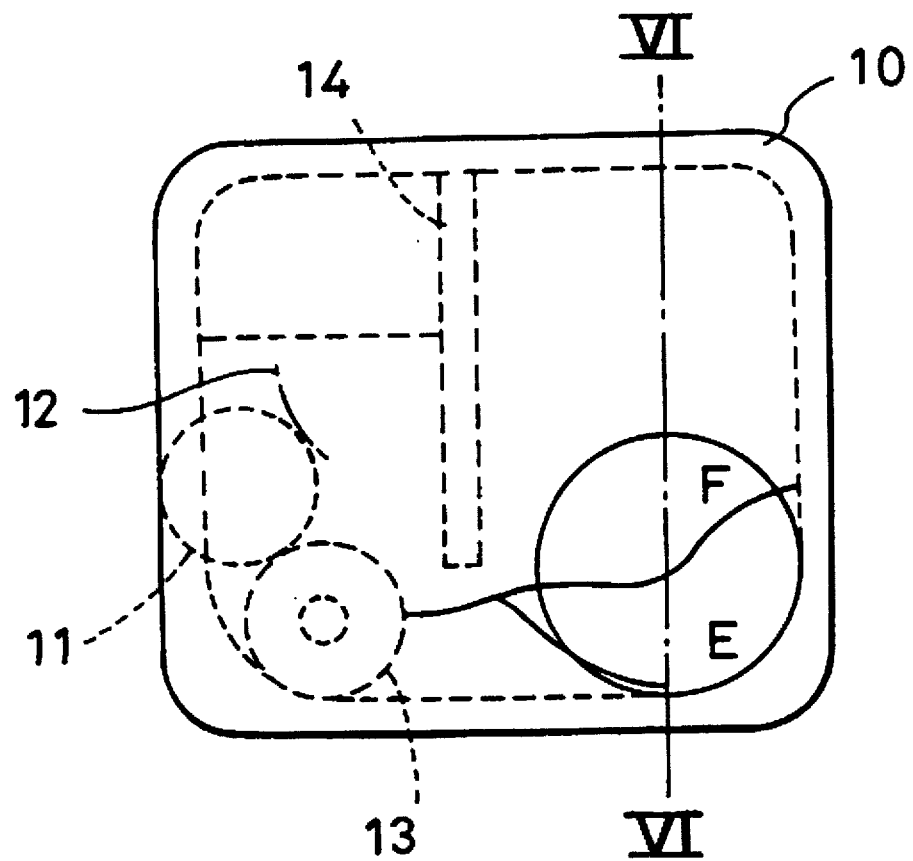
FIG. 5 is a plan view of a toner reservoir of a developing unit shown in FIG. 4.
Figure 6:
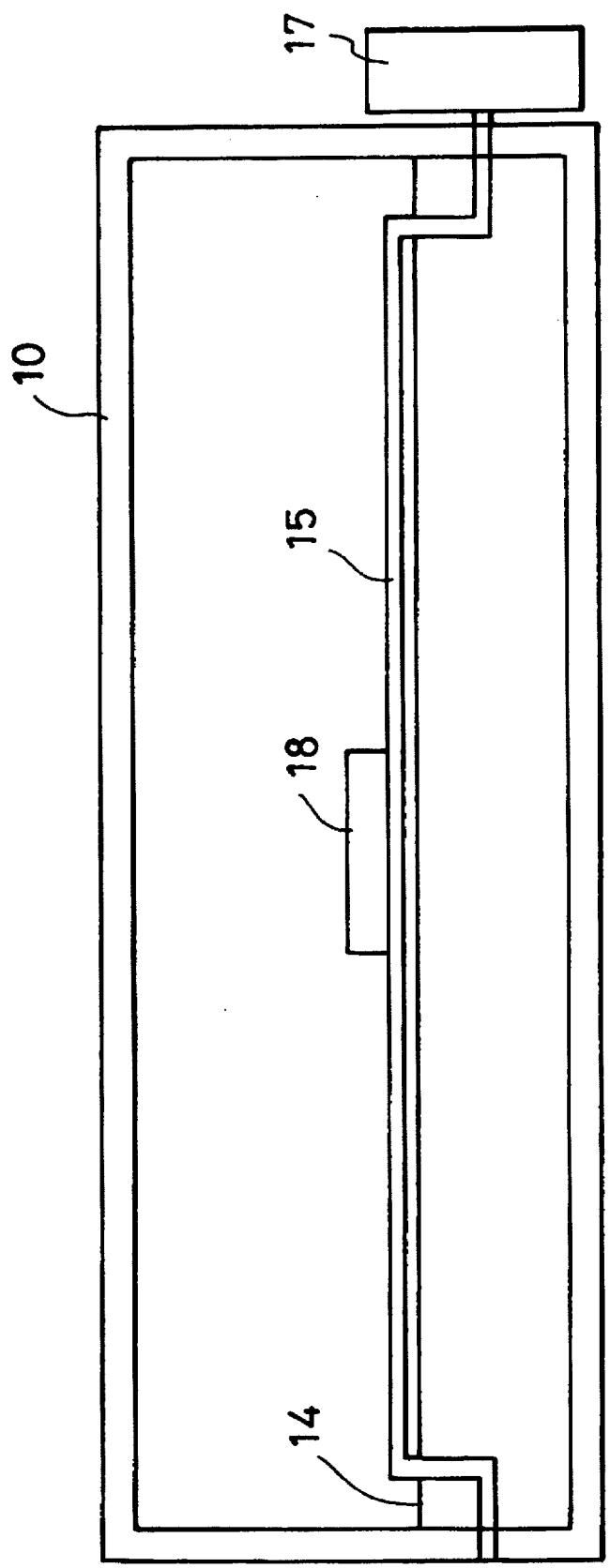
FIG. 6 is a longitudinal sectional view of the toner reservoir of FIG. 5 taken along line A—A.

In FIG. 4, reference numeral 4 denotes a detector for detecting a raised portion H disposed on the peripheral surface of the developing unit selection mechanism 108. The portion H represents the home position of the developing unit selection mechanism 108. A printer controller (not shown) detects the positions of individual developing units for respective colors relative to the portion H, and determines the rotation angle of the developing unit selection mechanism 108 thereby selecting a developing unit for a desired color. FIGS. 5 and 6 illustrate cross sections of one of four developing units shown in FIG. 4, wherein FIG. 6 illustrates a cross section taken along line A—A of FIG. 5. In FIGS. 5 and 6, the same portions as those in FIG. 4 are denoted by the same reference numerals.

In these figures, reference numeral 10 denotes one of toner reservoirs of the developing unit Dm, Dc, Dy, and Db described above referring to FIG. 4. Reference numeral 11 denotes a sleeve for carrying toner used to develop an latent image formed on the photosensitive drum. Reference numeral 12 denotes a blade via which the toner on the sleeve 11 is charged and, at the same time, the toner is coated uniformly on the sleeve 11. Reference numeral 13 denotes a coating roller that supplies, via its rotation motion, toner from the toner reservoir 10 to the sleeve 11. Reference numeral 14 denotes an isolation plate for isolating developing elements such as the sleeve from the toner reservoir. Reference numeral 15 denotes a stirring element that is rotated by a driving source (not shown) so that toner is supplied efficiently to the sleeve 11.

The stirring element 15 performs its stirring operation when the developing unit is moving relative to the photosensitive drum 1 in a developing process. Reference numeral 17 denotes a gear for transmitting a driving force to the stirring element 15.

Figure 7:
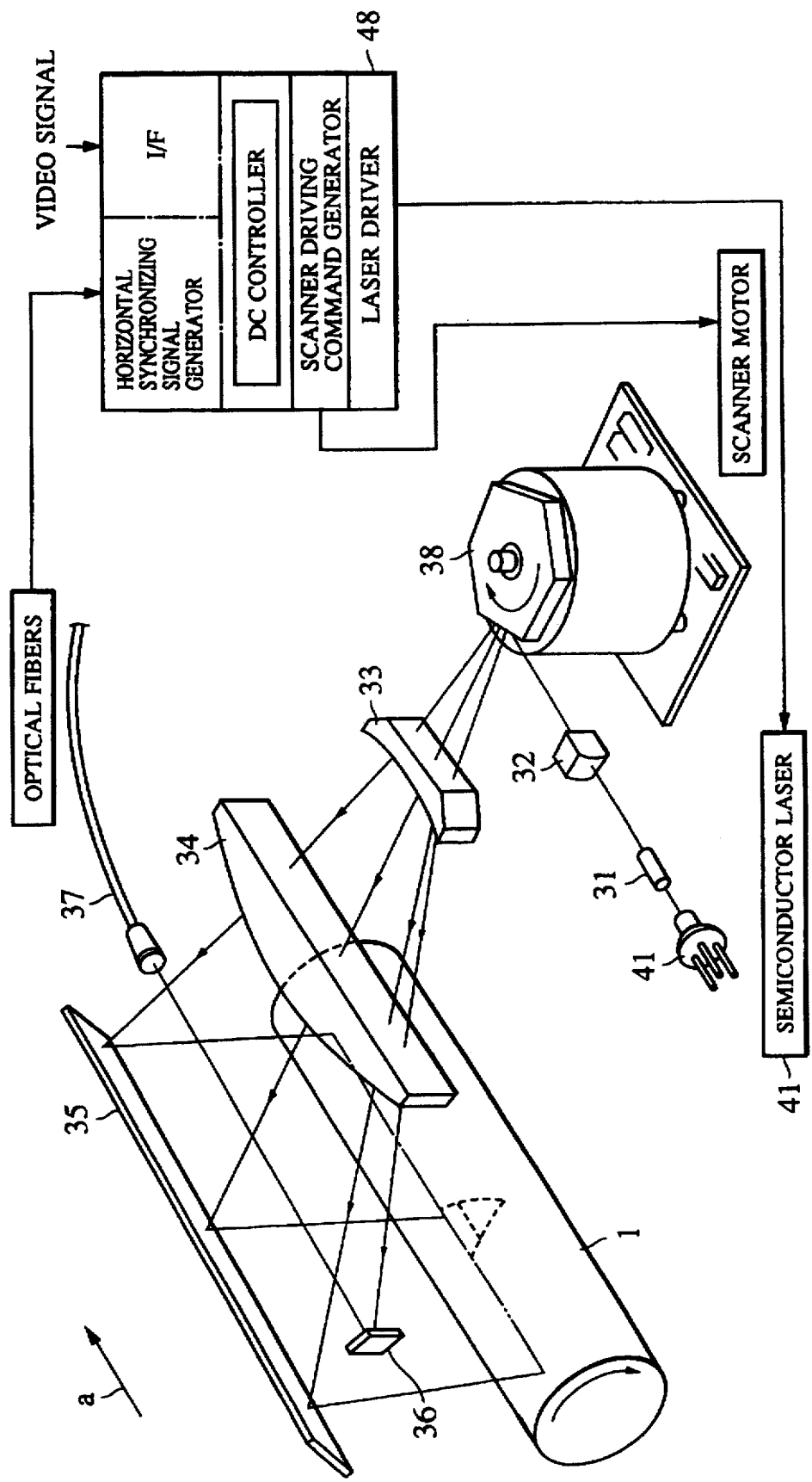
FIG. 7 is a perspective view illustrating the configuration of the image developing portion of the printer shown in FIG. 4.

In the apparatus described above, image exposure is performed by forming an image via a laser beam scanning operation. FIG. 7 illustrates the internal construction of the optical unit 107 serving as image exposure means shown in FIG. 4. This laser beam apparatus includes a semiconductor laser 41 that provides an optical output modulated by separated-color data of an image signal. A laser beam emitted by the laser 41 is incident on a rotating polyhedron (polygon mirror) 38 via a collimator lens 31 and a cylindrical lens 32.

The laser beam is deflected by the rotating polyhedron (polygon mirror) 38 and focused via an f-θ lens composed of a spherical lens 33 and a toric lens 34. The focused laser beam is further reflected by a reflecting mirror 35 and incident on the photosensitive drum 1. The surface of the photosensitive drum 1 is scanned by the laser beam in a predetermined direction "a" at a predetermined constant rate thereby performing image exposure corresponding to the separated-color image. A part of the laser beam is reflected by a horizontal synchronizing mirror 36 and received by an optical fiber 37. The information carried by the laser beam received via the optical fiber 37 is processed thereby obtaining an index signal (horizontal synchronizing signal) indicating a start of scanning of the laser beam in the line direction. A one-line image is written onto the photosensitive drum 1 using the index signal as reference.

Figure 1:
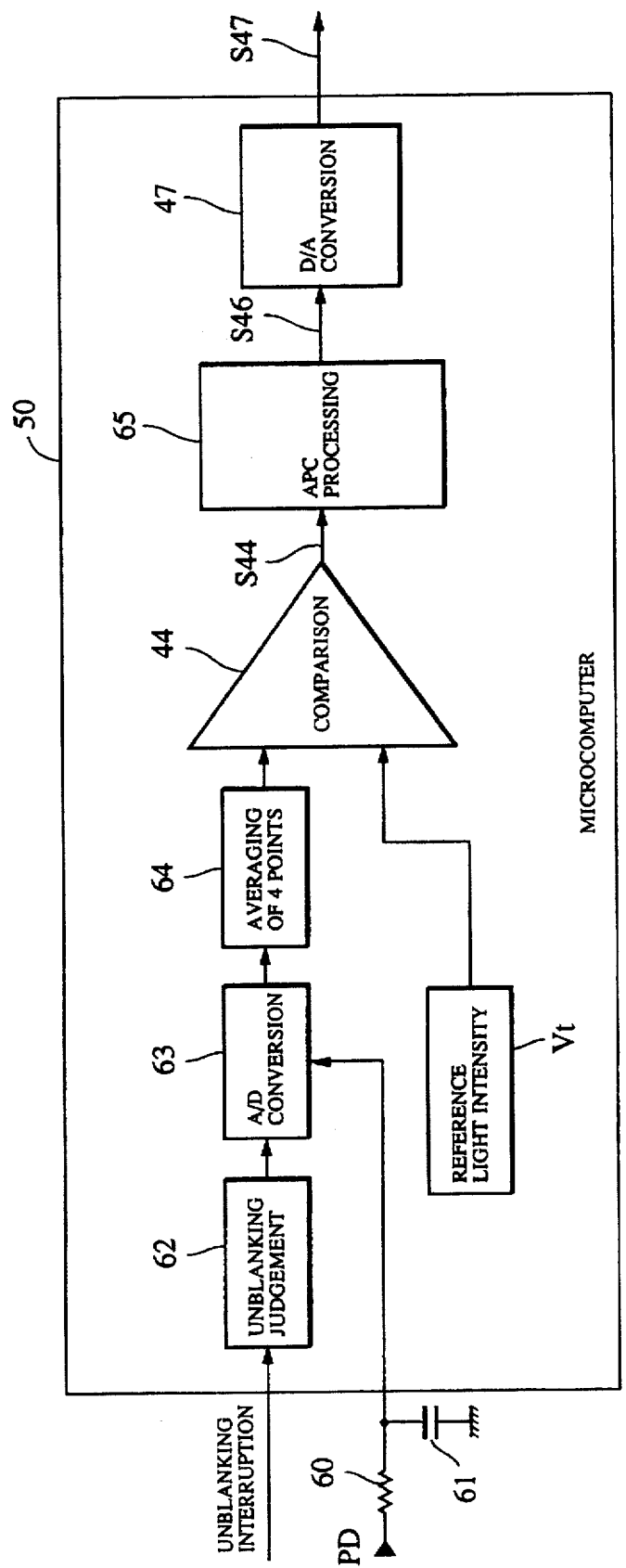
FIG. 1 is a functional block diagram illustrating an APC control process performed by a microcomputer according to one embodiment of the present invention.
Figure 8:
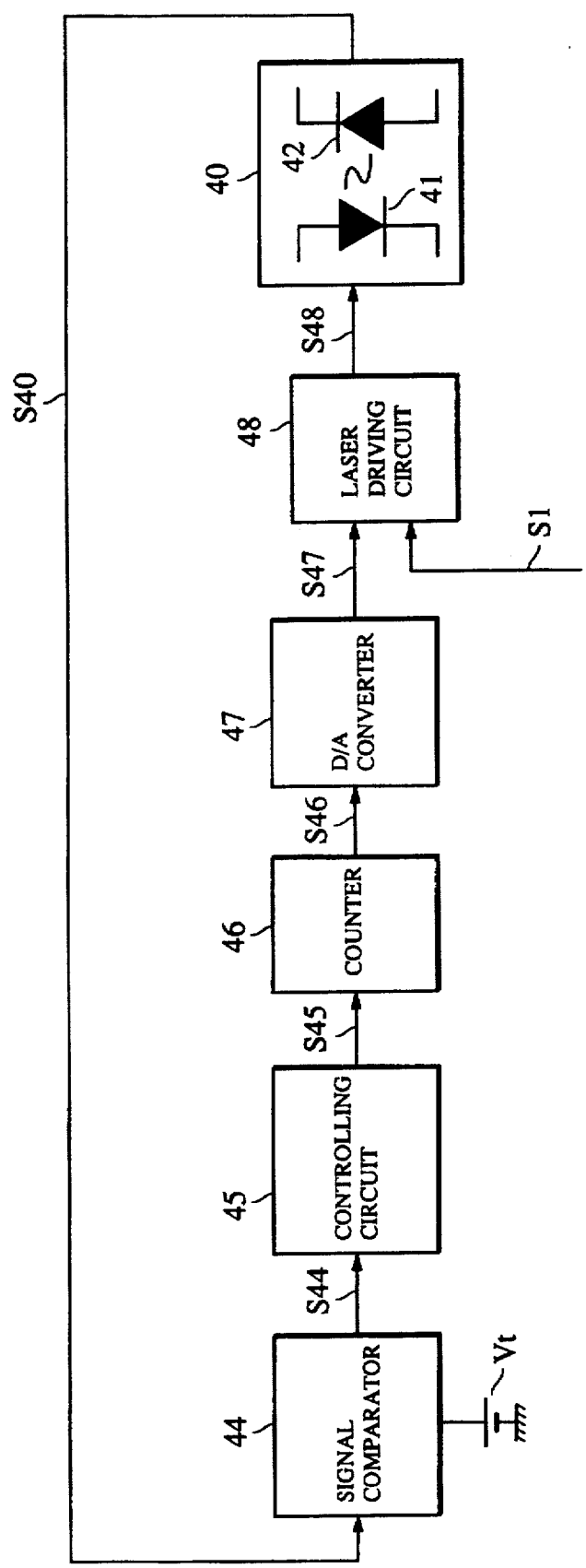
FIG. 8 is a block diagram illustrating an example of a configuration of a conventional APC circuit.
Figure 10:
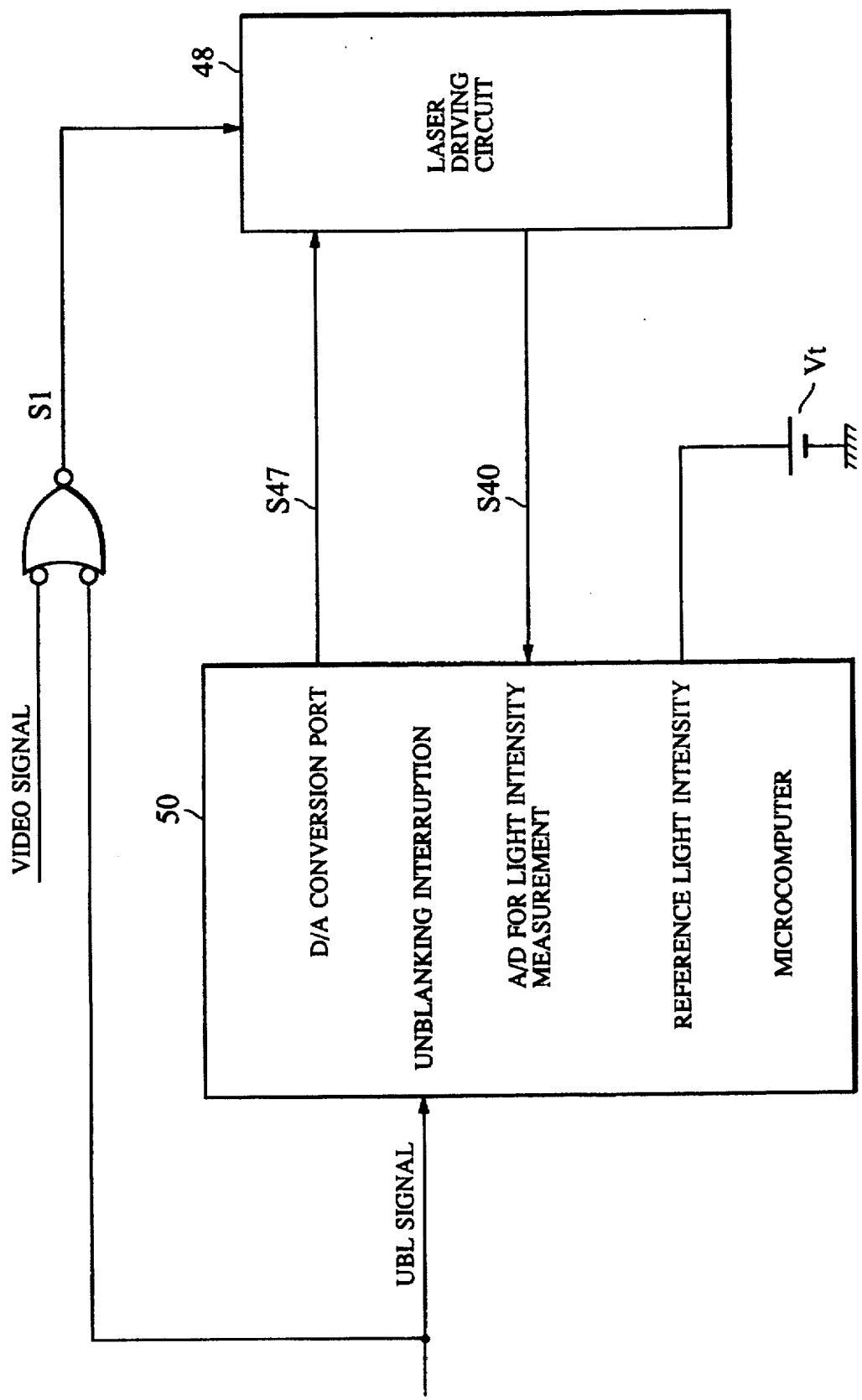
FIG. 10 is a block diagram illustrating a configuration of a microcomputer implementing a conventional automatic light intensity control system.

FIG. 1 is a functional block diagram illustrating a first embodiment of an image forming apparatus (color laser printer) according to the present invention, wherein the sequential steps for controlling the optical output of a semiconductor laser are accomplished by a microcomputer shown in FIG. 10. In FIG. 1, similar or corresponding elements and signals to those in FIG. 10 or 8 are denoted by similar reference numerals used in FIG. 10 or 8, and will not be described here again.

The microcomputer 50 controls the entire image forming apparatus.

In this embodiment, as shown in FIG. 1, the detected laser beam intensity is read four times and the average of these values are calculated. The average value is then compared with a reference value Vt of the laser beam intensity, and the APC control is performed according to the difference between these two values. In FIG. 1, reference numerals 62–65, 44, and 47 denote processes performed inside the microcomputer 50. A resistor 60 and capacitor 61 forms a low-pass filter for filtering the detected laser beam intensity signal (PD). This PD signal corresponds to the signal S40 in FIGS. 8 and 10.

In an unblanking judgement block 62, if the microcomputer 50 receives an unblanking interrupt request, actions will be taken as described below with reference to FIG. 13. After elapse of a certain time period (varies depending on the state in which the microcomputer 50 is when the microcomputer 50 receives the interrupt request), the microcomputer performs an interrupt process. In the interrupt process, the microcomputer 50 examines the level of the unblanking interrupt signal before acquiring a detected laser beam intensity signal S40 via an A/D port, so as to determine whether a laser is forced to be turned-on in a non-printing period (a period in which the UBL signal is at an active "L" level in the case of the timing chart shown in FIG. 13). Only when it is concluded that a laser is forced to be turned-on in a non-printing period, the unblanking judgement block 62 outputs an unblanking decision signal to the A/D converter 63 wherein the unblanking decision signal serves as an enable signal indicating permission to acquire the detected laser beam intensity signal S40. If the A/D converter 63 is enabled by the unblanking decision signal, the A/D converter 63 converts the detected laser-beam-intensity analog signal S40 given via the A/D port into a digital signal. A 4-point average calculating block 64 reads four data associated with the detected laser beam intensity and calculates the average of them. An APC (automatic power control) block 65 has the capability of a combination of the controlling circuit 45 and the counter 46 shown in FIG. 8. That is, the APC block 65 corrects or updates a driving signal S46 (in a digital form) for use in the laser driving circuit 48 according to a signal S44 provided by a comparator 44 wherein the signal S44 is given as a result of a comparison between the output of the 4-point average calculating block 64 and the reference value Vt corresponding to the target laser beam intensity. The APC block 65 outputs the resultant driving signal S46 to a succeeding D/A converter 47.

The D/A converter 47 converts digital correction data S46 received from the APC block 65 into an analog signal S47, which is transmitted as a laser-driving-current control signal to the laser driving circuit 48. A photodiode 42 disposed adjacent to a laser 41 of a laser unit 40 detects the intensity of a laser beam emitted by the laser 41 driven by a current corresponding to the above-described corrected and updated laser-driving-current control signal S47, and outputs a detected laser beam intensity signal S40 to the A/D port of the microcomputer 50 via low-pass filters 60 and 61. Then, the above-described sequential control steps are performed repeatedly until the level of the laser beam intensity signal S40 converges to a value within an allowed range in the vicinity of the reference value Vt corresponding to the target laser beam intensity.

Figure 2:
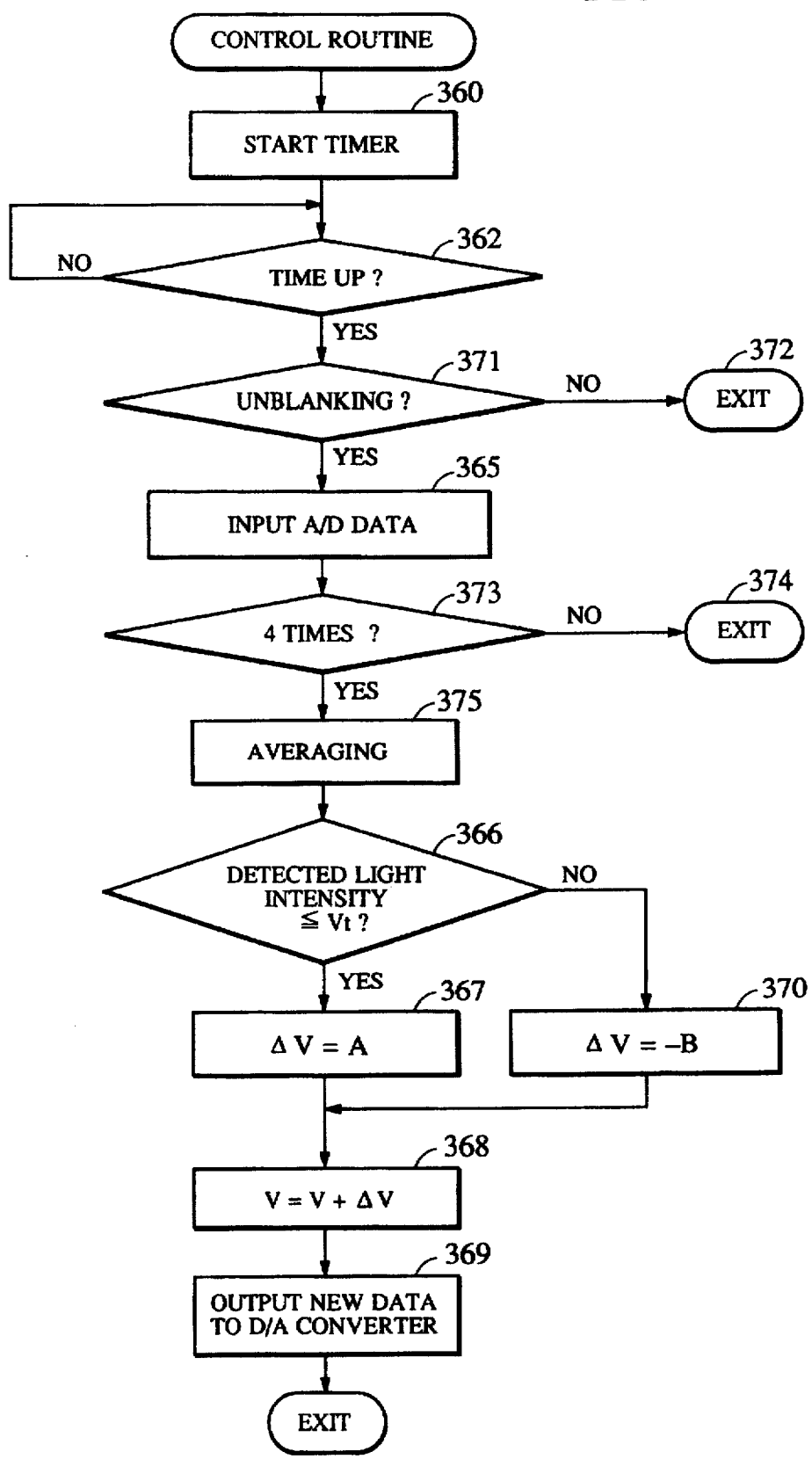
FIG. 2 is a flow chart illustrating in more detail the control steps of the control process shown in FIG. 1.
Figure 11:
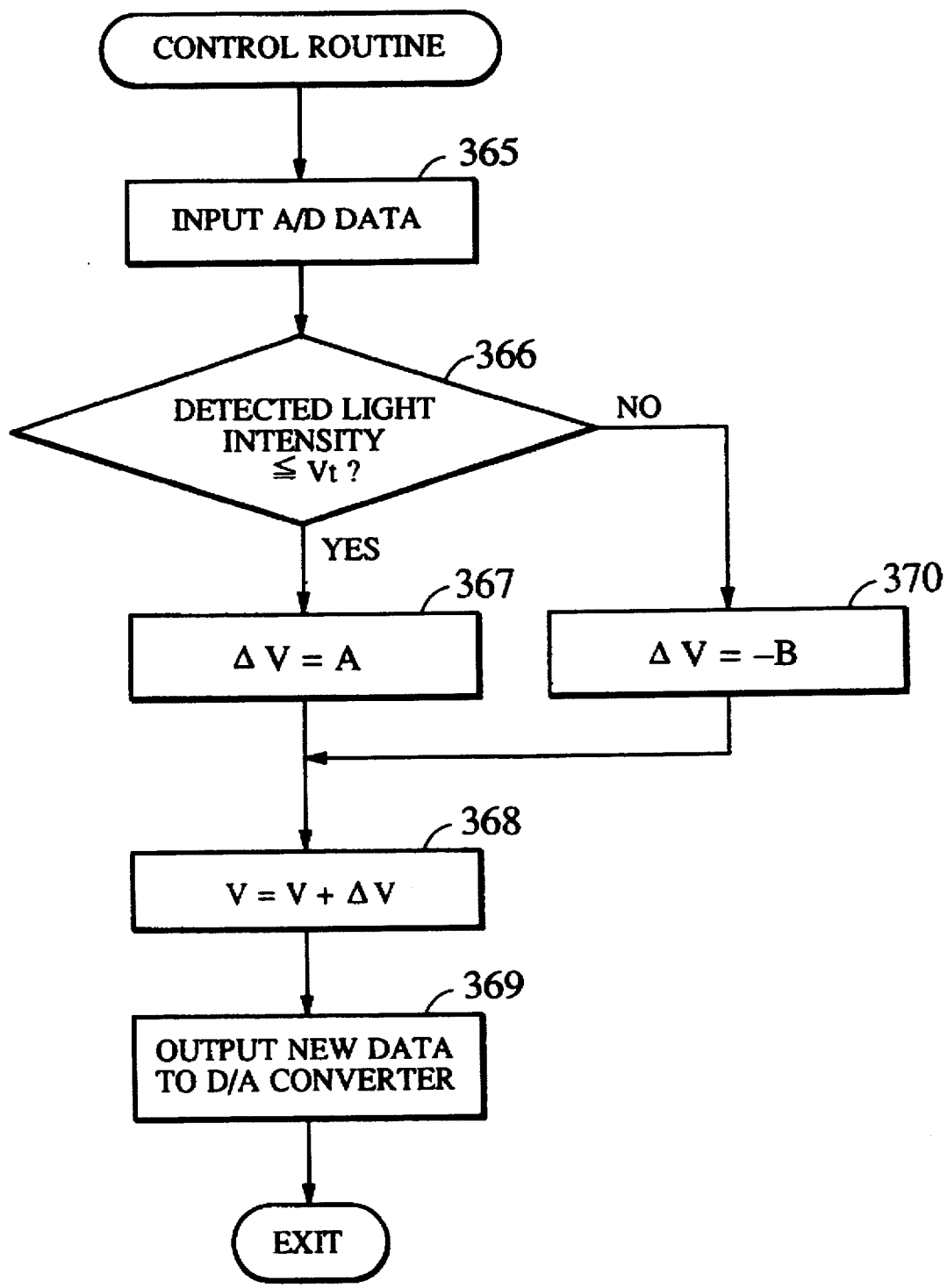
FIG. 11 is a flow chart illustrating the conventional light intensity control procedure.

FIG. 2 illustrates a specific example of a control procedure associated with the laser beam intensity control system shown in FIG. 1. In FIG. 2, the same process steps as those in FIG. 11 are denoted by the same reference numerals and these process steps will not be described here again. Thus, in the following description, only steps that are different from those in FIG. 11 will be described.

If the laser is turned on by an unblanking interrupt signal, an interrupt request to the microcomputer 50 occurs at the falling edge of the unblanking interrupt signal. In response to the interrupt request, the microcomputer 50 registers the interrupt request in an interrupt vector, and continues the process routine in the middle of execution as described above.

Alternatively, in response to the interrupt request, a flag may be set by means of software as described earlier. In any case, after the process routine in the middle of execution is completed, the control routine shown in FIG. 2 is executed.

In step 360, an internal timer in the microcomputer 50 is started. In step 362, it is determined whether the value of the timer reaches a timeout value Ta. If yes, then the routine proceeds to step 371. In step 371, it is determined whether a laser is forced to be turned-on in a non-printing period initiated by an unblanking interrupt signal. If no, the process exits from the control routine (step 372).

On the other hand, if it is concluded in step 371 that a laser is forced to be turned-on in a non-printing period, then A/D conversion data is input in step 365. Then, in step 373, it is determined whether the A/D conversion data has been input four times. If no, then the control routine returns to the main routine in step 374. If the A/D data has been input four times, then the average of the four A/D data is calculated thereby obtaining the average laser beam intensity (step 375). The other steps in the control procedure are similar to those in FIG. 11. Thus, the control procedure is performed repeatedly until the laser beam intensity signal converges to a value within an allowed range in the vicinity of the target laser beam intensity to be achieved.

In the present embodiment, the detected laser beam intensity signal S40 is input four times, and these four values are averaged. In the shortest case, therefore, the routine reaches the averaging step 375 after four successive unblanking interrupt requests have been accepted. On the other hand, if some unblanking interrupt request ends in an unfortunate result that the acquisition of a detected laser beam intensity signal S40 is not completed during a non-printing period (laser is in a forced turn-on state), then the averaging is performed after five or more unblanking interrupt requests have been accepted. However, a period T2 between adjacent pages or between a color and another color is generally as long as that corresponding to a few hundred lines, and an unblanking interrupt request is issued to the microcomputer 50 in each non-printing period of each of a few hundred lines, and thus there is enough time to successfully complete the averaging process.

In the present embodiment, the interrupt control routine waits in steps 360 and 362 for elapse of a predetermined time (corresponding to a period Ta which will be described later) before starting the acquisition of A/D data. Therefore, even if an interrupt request occurs just before the completion of a process routine in the middle of execution, and thus if the control routine starts just after the occurrence of the interrupt request, there is no chance to acquire A/D data during a period Ta shown in FIG. 14 in which the laser beam intensity detected by the PD is unstable.

Figure 13:
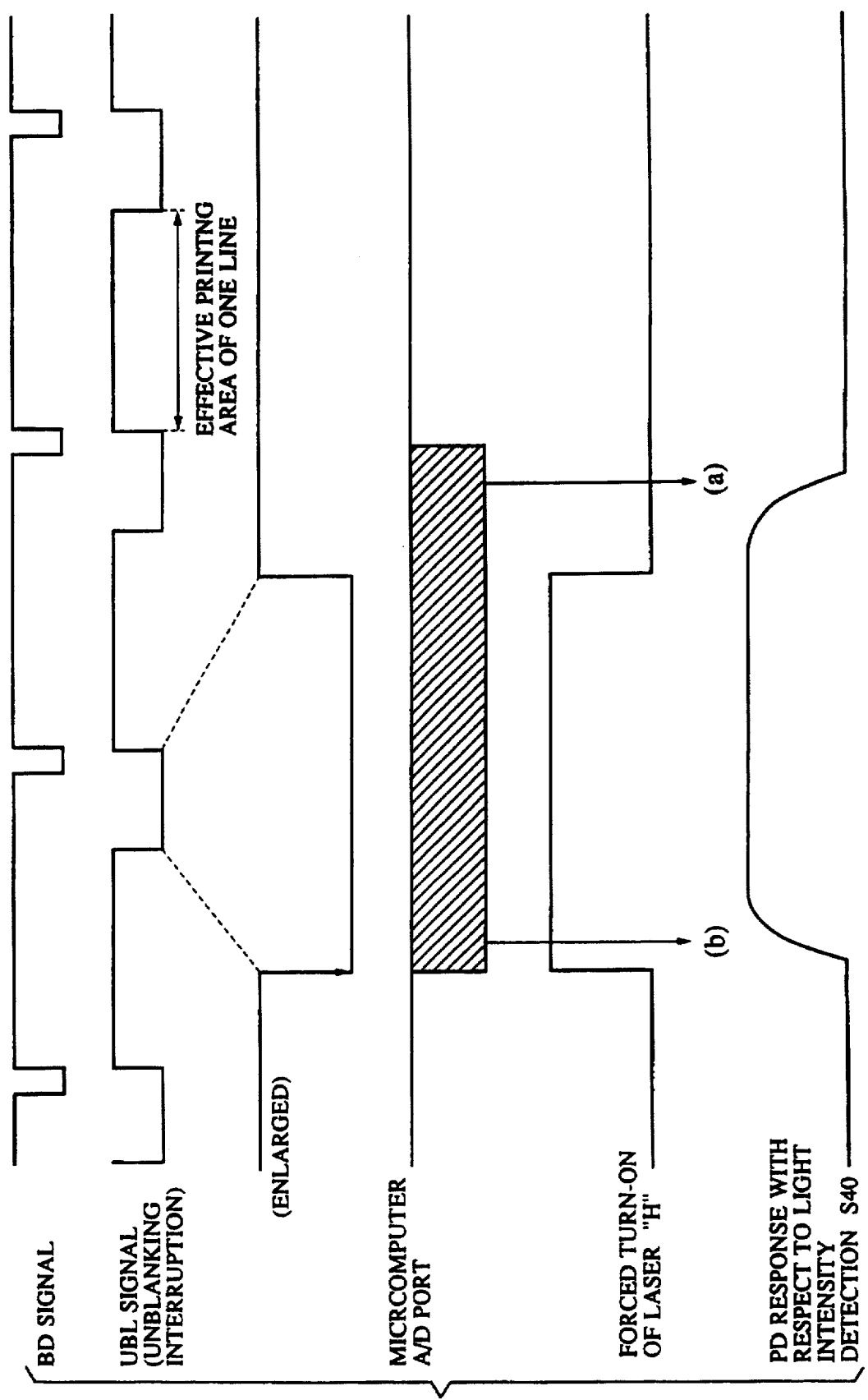
FIG. 13 is a timing chart illustrating the timing associated with signals relating to the light intensity control in the conventional technique.

This produces further advantage that low-pass filters (60 and 61 in FIG. 1) can be disposed for cutting noise without producing a chance to acquire improper A/D data such as that denoted by (b) in FIG. 13. Thus, it is possible to acquire only correct A/D data.

Figure 14:
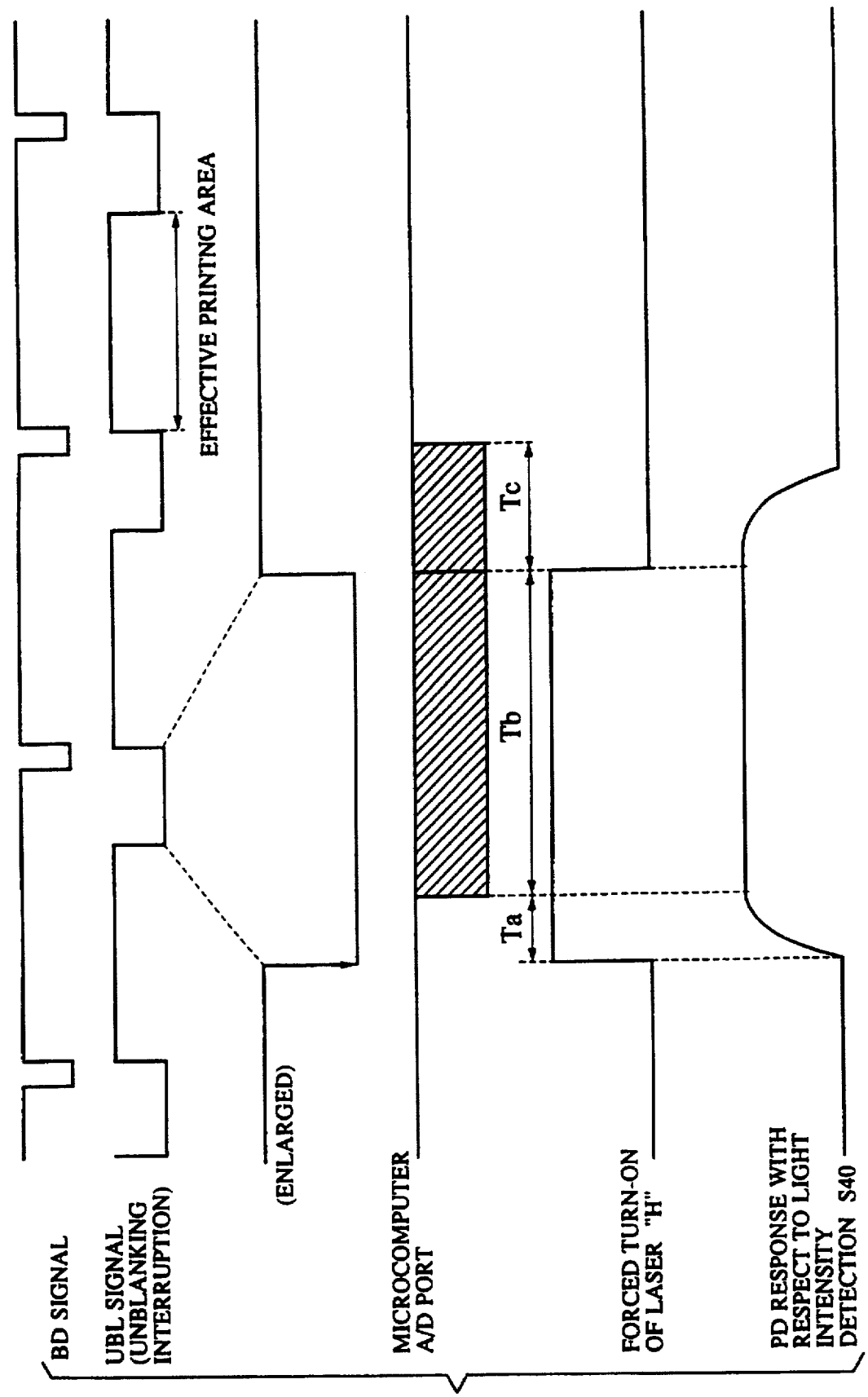
FIG. 14 is a timing chart relating to an embodiment of the present invention.

Furthermore, in step 371 just before the step of acquiring A/D data, it is determined whether the unblanking interrupt signal UBL is at a low level (active), and if the signal UBL is active (which means that the laser is in an on-state) then A/D data is acquired thereby preventing the acquisition of incorrect A/D data such as that denoted by (a) in FIG. 13 (or A/D data is not acquired during a period Tc shown in FIG. 14). Thus, it is possible to acquire only correct A/D data (during a period Tb in FIG. 14).

Alternatively, just after the acquisition of A/D data, it may be determined whether the signal UBL is active or not, and if it is not active then the acquired data may be discarded.

Second Embodiment

Figure 15:
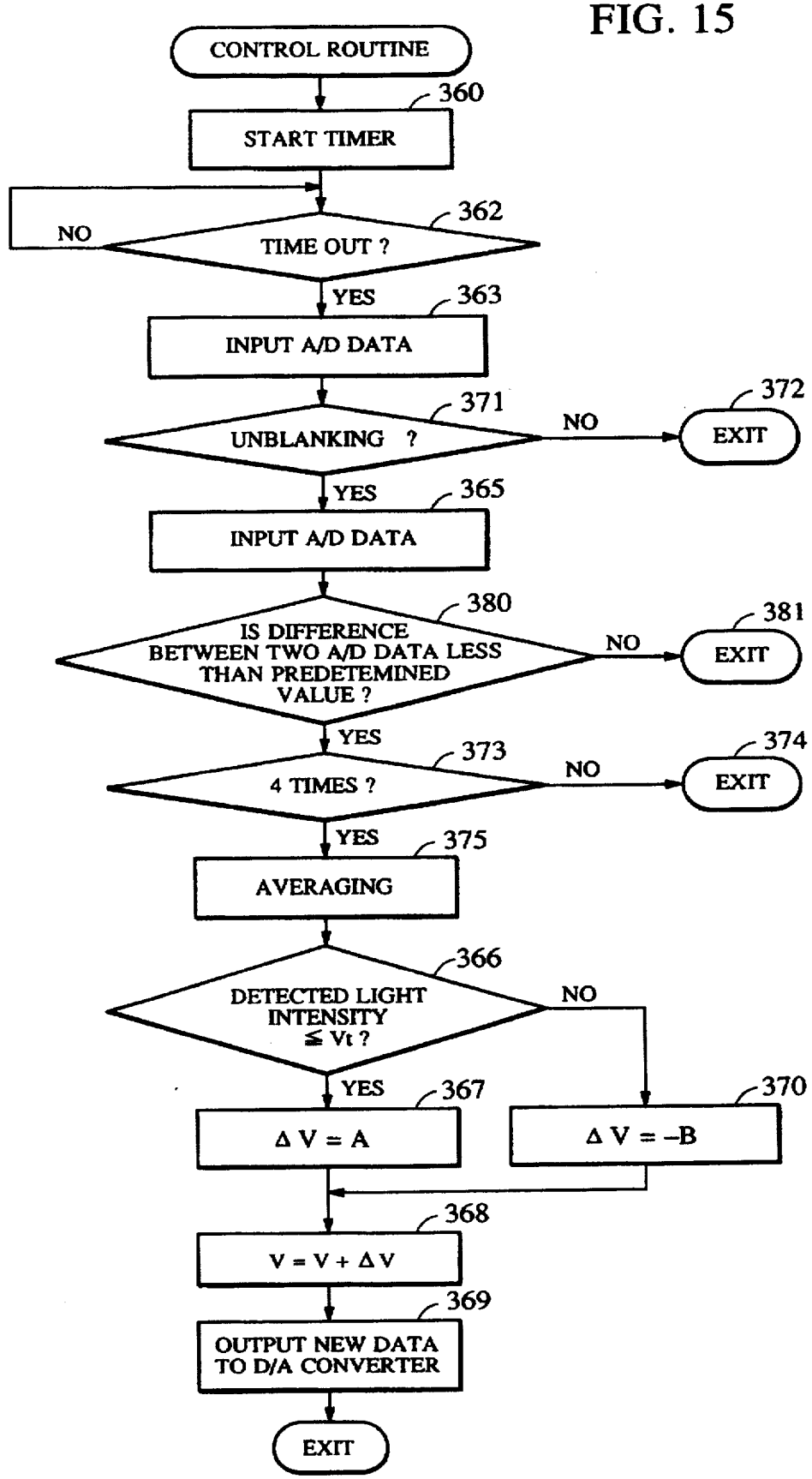
FIG. 15 is a flow chart relating to another embodiment of the present invention.

FIG. 15 is a flow chart illustrating a second embodiment of the present invention. The part other than shown by the flow chart of FIG. 15 is the same as that in the first embodiment described above. The same part will not be described here again, but only points different from those of the first embodiment will be described below with reference to FIG. 15.

In the second embodiment, the control routine starts at step 360, and the routine waits in steps 360 and 362 for elapse of a predetermined time. Then, A/D data is acquired in step 363. After that, steps 371 and 365 are performed in the same manner as in the first embodiment.

Thus, if it is concluded in step 371 that the signal UBL is active, then acquisition of A/D data is performed twice.

In step 380, it is determined whether the difference between two A/D data acquired in steps 363 and 365 is less than a predetermined value. If it is greater than the predetermined value, then the acquired A/D data are discarded and the interrupt routine returns to the main routine.

Even if the acquired A/D data includes an error due to noise or the like, such data is discarded and thus erroneous laser beam intensity control according to such incorrect data is prevented.

In the embodiments of the present invention described above, it is determined whether a laser is forced to be turned-on in a non-printing period, and if yes a detected laser beam intensity signal S40 is acquired four times. The average of these four values are calculated thereby obtaining normalized detected laser beam intensity data. The laser beam intensity is then controlled based on this data. However, the present invention is not limited to such the average method described above, and various alternatives are possible as described below.

(1) After a determination of whether a laser is forced to be turned-on in a non-printing period, a detected laser beam intensity signal S40 is acquired only once. If it is concluded that a laser is not forced to be turned-on in a non-printing period, then the acquisition of data is not performed as in the embodiments described above. In this case, however, the old data that was acquired just previously and held may be used as new data, or otherwise the routine may wait for acquisition of proper data. Then, the driving signal for use by the laser driving circuit 48 is updated, and transmitted to the D/A converter 47.

(2) After a determination of whether a laser is forced to be turned-on in a non-printing period, a detected laser beam intensity signal S40 is acquired a plurality of times as in the first embodiment. Even if some acquisition of the laser beam intensity signal S40 is not completed successfully during a non-printing period, and thus if the number of acquired data is less than the predetermined number, the average value may be calculated using only the correctly acquired data.

(3) If the number of the correctly acquired data is less than the predetermined number in the above technique (2), then a number of data that should be added to reach the above predetermined number may be obtained by using the old normalized detected laser beam intensity data or otherwise raw data used in the previous laser beam intensity control cycle. Then, averaging is performed.

In the above alternative techniques (2) and (3), since the number of acquired data is less than the predetermined number as opposed in the first embodiment, there is some possibility that the accuracy in the laser beam intensity control becomes poor compared to that in the first embodiment. However, these techniques can be used advantageously in printers that operate at a high speed with a shorter non-printing period (period T2 in FIG. 12).

The microcomputer 50 used in the present invention may be a microcomputer dedicated to the laser beam intensity control, or alternatively a microcomputer responsible for the control of the entire printing apparatus may be used to also perform the laser beam intensity control. As for the A/D and D/A converters, if the microcomputer 50 itself has a built-in A/D converter or D/A converter, then the built-in A/D or D/A converter may be used. If the microcomputer 50 does not have such an A/D converter or D/A converter, an A/D or D/A converter may be disposed in the outside of the microcomputer 50.

Figure 3:
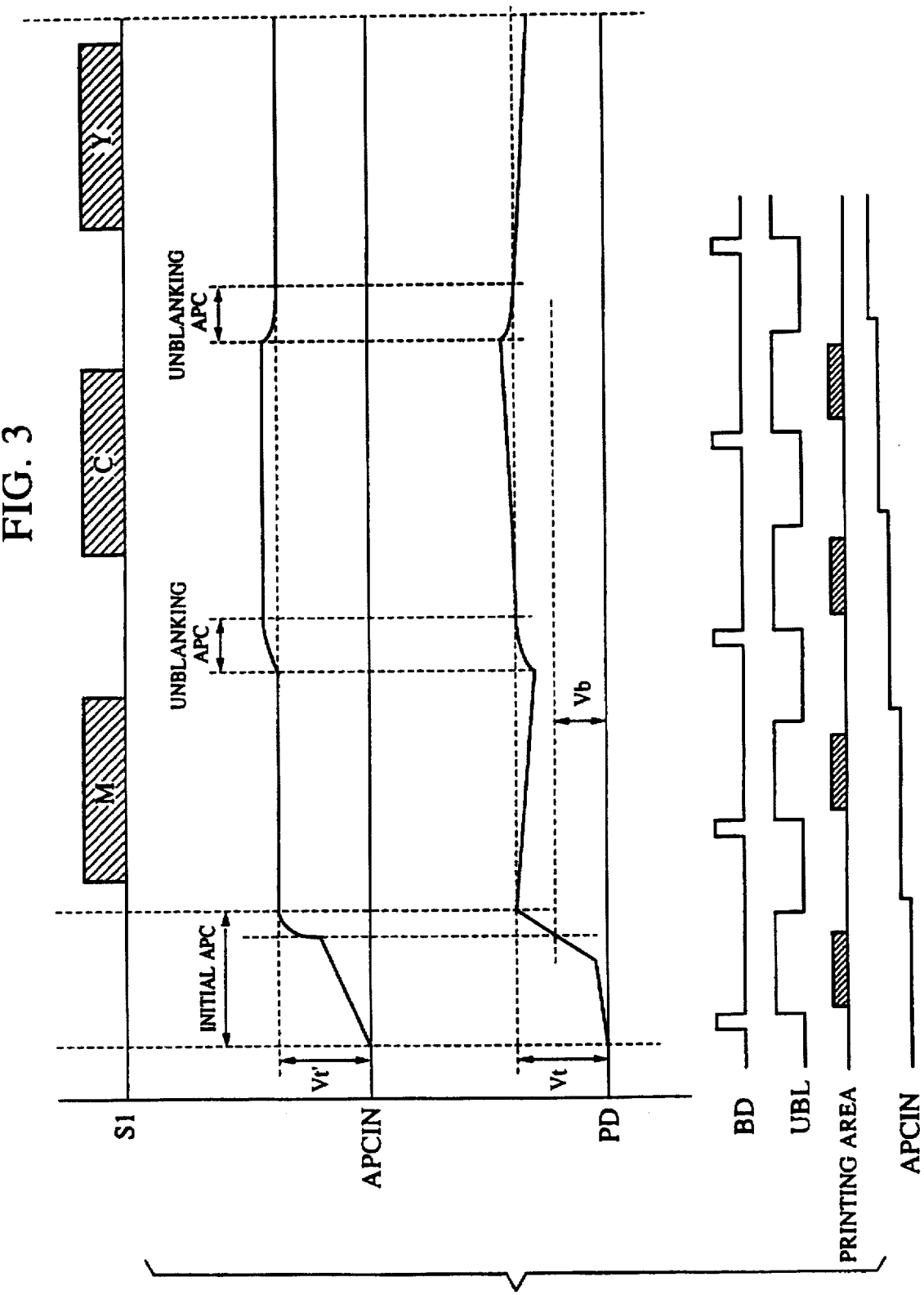
FIG. 3 is a timing chart illustrating an example of timing associated with the process in the control steps shown in FIG. 2.
Figure 9:
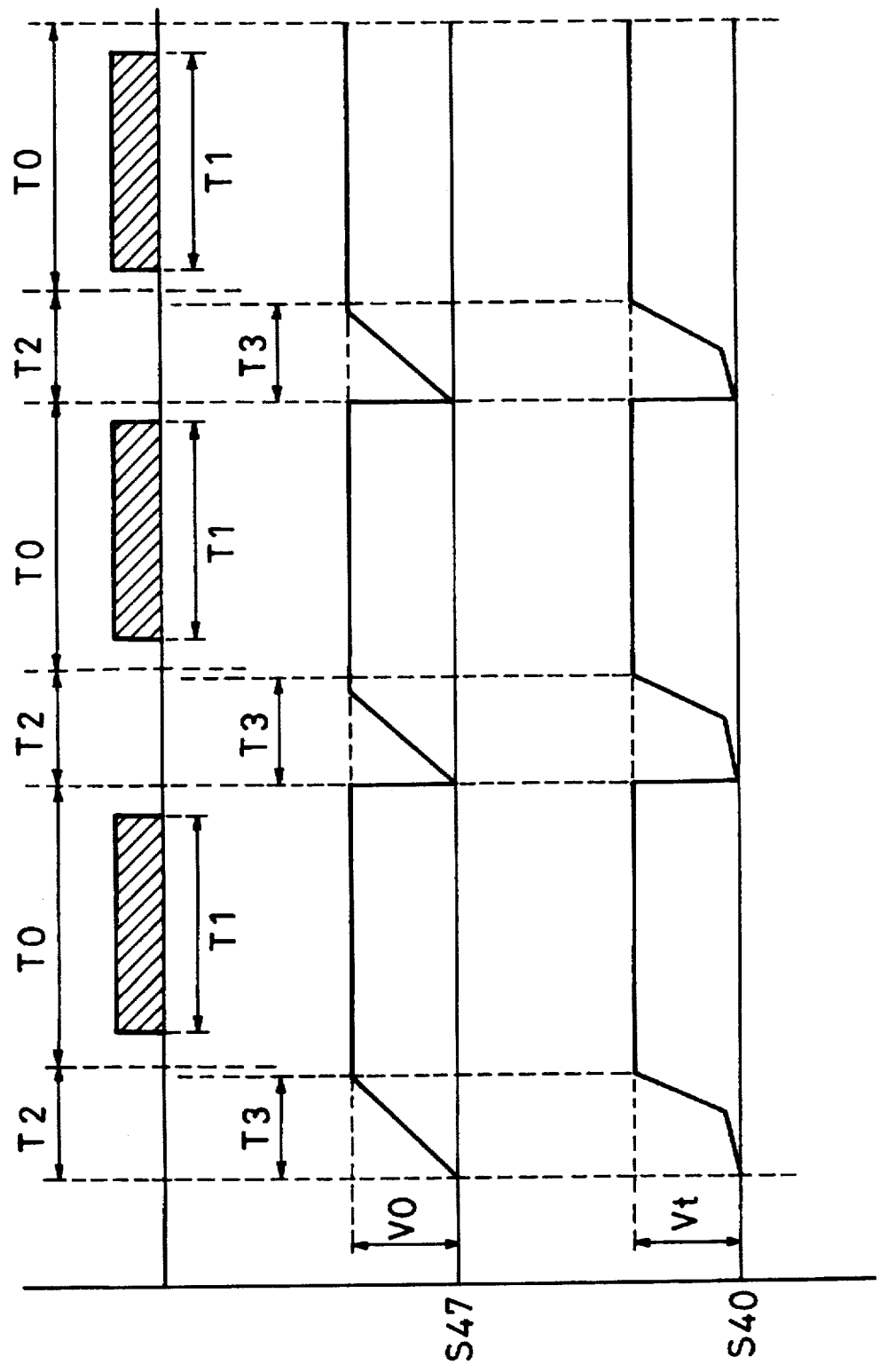
FIG. 9 is a timing chart illustrating timing associated with the process performed by the circuit shown in FIG. 8.

In all cases described above, the laser beam intensity starts from an initial value of zero in each cycle of the laser beam intensity control as represented by the waveform S47 of FIG. 9. Alternatively, the final value in the previous cycle of the laser beam intensity control may be employed as the initial value of the current cycle, and only fine adjustment may be performed in the current cycle as shown in the timing chart of FIG. 3. In this case, it is possible to achieve a great reduction in control time required to reach a steady state in which the laser beam intensity is maintained at a proper value.

In the present invention, as described above, when a detected laser beam intensity signal S40 is acquired, it is determined whether a laser is forced to be turned-on in a non-printing period, and if a laser is not forced to be turned-on in a non-printing period, then it is inhibited to acquire the detected laser beam intensity signal. In the non-printing period, the laser is forced to be turned on, and the photodiode disposed adjacent to the laser detects the intensity of the laser beam emitted by the laser. The level of the detected laser beam intensity is compared with the predetermined target value of the laser beam intensity to be achieved, and the laser beam intensity is controlled such that the difference obtained in the above comparison is minimized. Thus, in this laser beam intensity controlling apparatus according to the present invention, it is possible to acquire a detected laser beam intensity when the laser is in a normal operation state with no possibility of acquiring an incorrect data obtained in the middle of or after an on-to-off transition. As a result, the present invention provides an automatic laser beam intensity control system that operates stably without being disturbed by incorrect data acquisition.

Particularly in apparatus in which laser beam scanning is performed at a relatively high rate, an unblanking period (forced turn-on period in each line) becomes short, and therefore the problems described above in connection with FIG. 13 occur often. The present invention can be used advantageously in such an apparatus with no problems.

Figure 12:
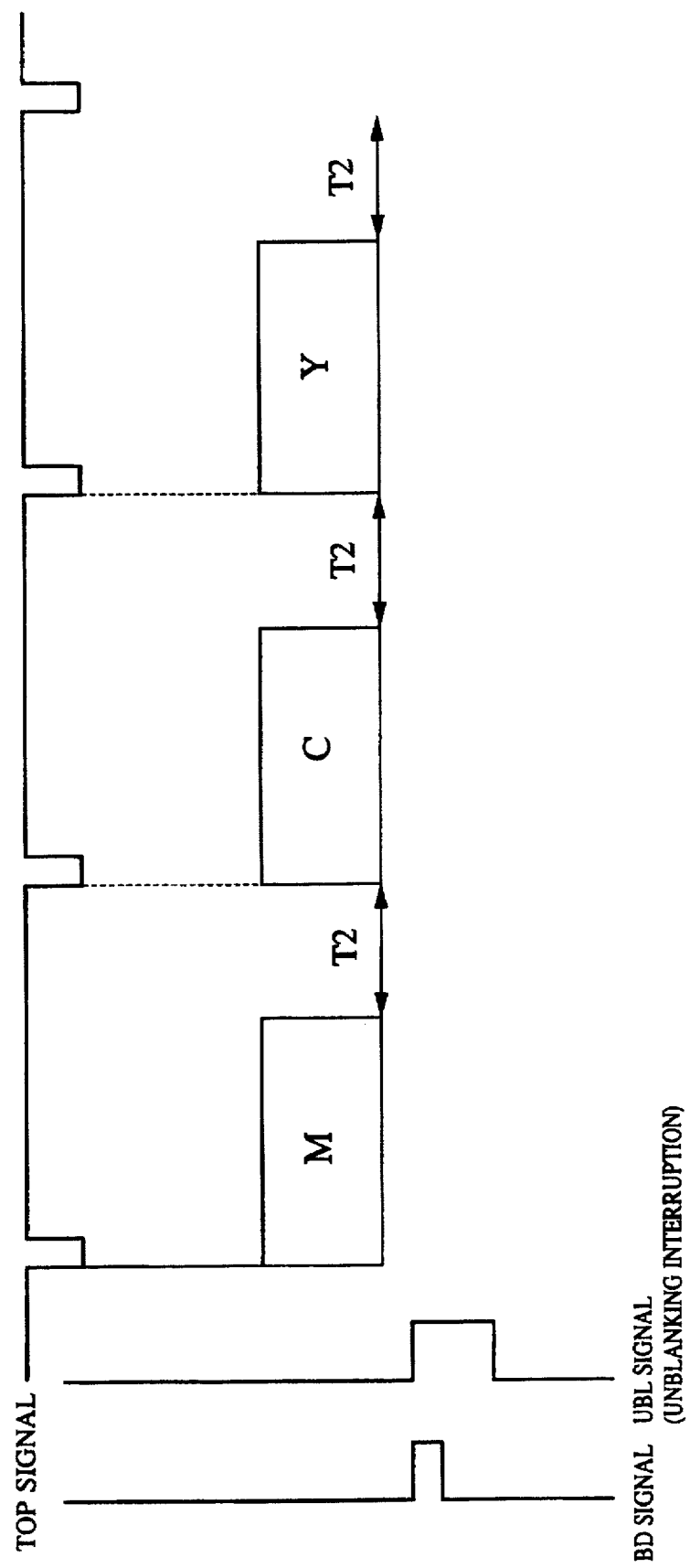
FIG. 12 is a timing chart illustrating a time period (vertical blanking period) between adjacent printing periods in the conventional technique.

Furthermore, in the present invention, unblanking APC is performed during a period between adjacent pages (among colors in the color period, period T2 shown in FIGS. 9 and 12). If the unblanking period in a period T2 is set to a value greater than the unblanking period in an image forming period (a period T0 shown in FIG. 9), then it becomes possible to apply the present invention to an apparatus in which the laser beam scanning is performed at a very high rate.

The term "image forming apparatus" used here is intended to broadly refer to apparatus for forming an image including not only a stand-alone printer but also a built-in printer used in a word processor, personal computer, facsimile machine, etc.

While the invention has been described herein relative to its preferred embodiments, it is to be understood that various modifications and alternatives are possible without departing from the spirit of the invention as defined in the appended claims.

What is claimed is:

1. An image forming apparatus in which detection means detects laser beam intensity of a semiconductor laser, said image forming apparatus comprising:

judgement means for judging whether said semiconductor laser is in a forced turn-on state; and control means that inhibits acquisition of a detected laser beam intensity signal if said judgement means judges that said semiconductor laser is not in the forced turn-on state, and permits acquisition of said detected laser beam intensity signal if said judgement means has concluded that said semiconductor laser is in the forced turn-on state.

2. An image forming apparatus according to claim 1, further comprising averaging process means for (1) acquiring said detected laser beam intensity signal a plurality of times in a case where said control means permits said detected laser beam intensity signal to be acquired, and (2) determining an average of said plurality of acquired laser beam intensity signals thereby providing a normalized detected laser beam intensity for use as automatic laser beam intensity control data.

3. An image forming apparatus according to claim 1, further comprising means for using the detected laser beam intensity signal from a previous automatic laser beam intensity control cycle as automatic laser beam intensity control data when acquisition of said detected laser beam intensity signal is inhibited by said control means.

4. An image forming apparatus according to claim 2, wherein when acquisition of said detected laser beam intensity signal is inhibited by said control means, said averaging process means employs the detected laser beam intensity value from a previous automatic laser beam intensity control cycle as one of said plurality of detected laser beam intensity values, and determines an average of said plurality of acquired laser beam intensity signals.

5. An image forming apparatus according to claim 2, wherein in a case where acquisition processes of said laser beam intensity signal numbers less than a predetermined number in a predetermined time period, said averaging process means performs an averaging process using laser beam intensity values that have been acquired already by that time period.

6. A method of controlling an intensity of scanning light used in an image forming apparatus that forms an image by scanning a photosensitive material by light modulated by an image signal, said method comprising the steps of:

requesting an interrupt in response to a signal used to force turn-on of a scanning light source during a period in which a non-image scanning area is scanned;

judging whether or not the intensity of said scanning light is detected when said light source is in a turn-on state, said judging step being performed in a control routine that is called in response to the interrupt requested in said requesting step; and controlling said light source in such a manner that if said judging step concludes that the intensity of said scanning light is detected when said light source is in the turn-on state, then said light source is controlled according to a value of the detected intensity.

7. A method of controlling the intensity of scanning light, according to claim 6, wherein said controlling step includes a step of calculating an average of a plurality of detected values of light intensity obtained by performing light intensity detection a plurality of times.

8. A method of controlling the intensity of scanning light, according to claim 6, wherein said step of requesting an interrupt is performed for each scanning line in a non-printing period in each interval between image forming processes of adjacent pages.

9. A method of controlling the intensity of scanning light, according to claim 6, wherein said image forming apparatus forms an image having a plurality of color components, and said step of requesting an interrupt is performed for each scanning line in a non-printing period in an interval between processes of forming an image of individual color components.

10. A method of controlling the intensity of scanning light, according to claim 6, wherein a period during which the scanning light source is forcibly turned on for each scanning line in a one-page printing period is set to a value different from a period during which the scanning light source is forcibly turned on for each scanning line in a non-printing period between adjacent pages.

11. A method of controlling the intensity of scanning light used in an image forming apparatus for forming an image by scanning a photosensitive material by light modulated by an image signal, said method comprising the steps of:

requesting an interrupt in response to a signal used to force turn-on of a scanning light source during a period in which a non-image scanning area is scanned;

measuring elapse of time after a call of a routine, said measuring step being performed in a control routine that is called in response to the interrupt requested in said requesting step; and controlling said light source in such a manner that when the elapse time measured in said step of measuring elapse of time has reached a predetermined value, said light source is controlled according to the intensity of said scanning light.

12. A method of controlling the intensity of scanning light, according to claim 11, wherein said controlling step includes a step of calculating an average of a plurality of detected values of light intensity obtained by performing light intensity detection a plurality of times.

13. A method of controlling the intensity of scanning light, according to claim 11, wherein said step of requesting an interrupt is performed for each scanning line in a non-printing period in each interval between image forming processes of adjacent pages.

14. A method of controlling the intensity of scanning light, according to claim 11, wherein said image forming apparatus forms an image having a plurality of color components, and said step of requesting an interrupt is performed for each scanning line in a non-printing period in an interval between processes of forming an image of individual color components.

15. A method of controlling the intensity of scanning light, according to claim 11, wherein a period during which the scanning light source is forcibly turned on for each scanning line in a one-page printing period is set to a value different from a period during which the scanning light source is forcibly turned on for each scanning line in a non-printing period between adjacent pages.

* * * * *